United States Patent
Fahmy et al.

(10) Patent No.: US 7,716,653 B2
(45) Date of Patent: May 11, 2010

(54) CONFIGURABLE IMPORTERS AND RESOURCE WRITERS FOR CONVERTING DATA INTO ANOTHER FORMAT

(75) Inventors: Hesham E. Fahmy, Etobicoke (CA); John H. Green, Toronto (CA); Vladimir Klicnik, Oshawa (CA)

(73) Assignee: International Business Machines Corporation, Armonk, NY (US)

(*) Notice: Subject to any disclaimer, the term of this patent is extended or adjusted under 35 U.S.C. 154(b) by 1070 days.

(21) Appl. No.: 11/399,232

(22) Filed: Apr. 6, 2006

(65) Prior Publication Data
US 2007/0236369 A1 Oct. 11, 2007

(51) Int. Cl.
*G06F 9/45* (2006.01)
(52) U.S. Cl. .................. 717/136; 717/137; 717/141
(58) Field of Classification Search .......... 717/136–142
See application file for complete search history.

(56) References Cited

U.S. PATENT DOCUMENTS

| | | | |
|---|---|---|---|
| 5,507,030 A * | 4/1996 | Sites ........................... | 717/136 |
| 5,625,823 A * | 4/1997 | Debenedictis et al. ....... | 717/139 |
| 5,642,513 A * | 6/1997 | Schnellinger et al. ....... | 717/141 |
| 5,825,877 A * | 10/1998 | Dan et al. ..................... | 705/54 |
| 6,286,134 B1 * | 9/2001 | Click et al. ................... | 717/138 |
| 6,523,170 B1 * | 2/2003 | Cuomo et al. ................ | 717/136 |
| 6,807,632 B1 | 10/2004 | Carpentier et al. | |
| 6,928,640 B2 * | 8/2005 | Schlussman ................. | 717/137 |
| 6,941,545 B1 * | 9/2005 | Reese et al. .................. | 717/130 |
| 6,961,932 B2 * | 11/2005 | Mishra et al. ................ | 717/136 |
| 7,278,136 B2 * | 10/2007 | Moritz et al. ................ | 717/152 |
| 7,376,939 B1 * | 5/2008 | Nayak et al. ................. | 717/144 |
| 7,421,686 B2 * | 9/2008 | Souloglou et al. ........... | 717/146 |
| 7,434,211 B2 * | 10/2008 | Wynn et al. .................. | 717/141 |
| 7,444,619 B2 * | 10/2008 | McManus ..................... | 717/114 |
| 7,467,375 B2 * | 12/2008 | Tondreau et al. ............ | 717/137 |
| 7,519,956 B2 * | 4/2009 | Fukuda et al. ............... | 717/125 |
| 7,533,246 B2 * | 5/2009 | Taylor ........................... | 712/34 |
| 7,581,212 B2 * | 8/2009 | West et al. .................... | 717/136 |
| 2003/0084425 A1 | 5/2003 | Glaser | |
| 2004/0162724 A1 | 8/2004 | Hill et al. | |

OTHER PUBLICATIONS

Psaila, "Virtual DOM an efficient virtual memory representation for large XML documents", IEEE, pp. 233-237, 2008.*

(Continued)

*Primary Examiner*—Anil Khatri
(74) *Attorney, Agent, or Firm*—Daniel McLoughlin; Hoffman Warnick LLC

(57) ABSTRACT

The present invention provides a component-based tool for converting a data source from a first format into a second format. Specifically, the present invention includes reusable importer and resource writer components. Each importer component is designed to import all or a portion of a data source of a particular first data type and convert this data source from the first data type into an intermediate data type. A resource writer component may then convert the data source in the intermediate data type into an application artifact in the specific second data format that corresponds to the resource writer. Furthermore, a framework may be included within which the appropriate importer and resource writer may be stored and/or chosen from a plurality of importers and resource writers for performing a required conversion.

20 Claims, 6 Drawing Sheets

OTHER PUBLICATIONS

Al-Ekram et al, "An XML based framework for language netural program representation and generic analaysis", IEEE COMPSAC, pp. 1-2, 2004.*

Engelen, "Code generation techniques for developing light weight XML web services for embaded devices" ACM SAC, pp. 854-861, 2004.*

Hentrich et al, "Patterens for business object model integration in process driven and service oriented architecture", ACM PLoP, pp. 1-14, 2006.*

Corwin et al, "MJ; A rational module system for Java and its applications", ACM OOPSLA, pp. 241-254, 2003.*

* cited by examiner

CONFIGURABLE IMPORTERS AND RESOURCE WRITERS FOR CONVERTING DATA INTO ANOTHER FORMAT

FIELD OF THE INVENTION

The present invention generally relates to data manipulation. Specifically, the present invention provides tools for importing data in one format and generating output for use in a second format.

BACKGROUND OF THE INVENTION

The world of information technology is a dynamic and rapidly changing world. As this world of information technology evolves, new tools are constantly being developed to assist in its further development. Because of this constant evolution, a tool that was cutting edge just a short time ago may be virtually obsolete today.

This rapid obsolesce caused by new tools is especially true in the area of development tools. These development tools are tools that are used by a developer to create new forms of data. They include such tools as programming languages, database creation and management software, word processors, and spreadsheet programs. Each of these types of development tools allows a developer to use data in important and unique ways.

One major challenge in the industry occurs in the case that a development tool that had been used to develop a number of data sources becomes supplanted by a newer development tool. A developer that encounters such a situation may be forced to choose from a number of unpleasant options. If the developer refuses to make a change to the new software in order to maintain the current group of data sources, new efficiency and functionality resulting from the new development tool may be sacrificed. In contrast, if the user decides to employ the new development tool, the current data sources must be rewritten in the new format, converted from the old format to the new format, or discarded. Any of these options may result in large amounts of time and/or money simply to return the developer to a place in which the data sources may be used as previously.

Currently, there are a few tools for converting from a particular old format to a particular new format. However, these tools are limited in that they are dependant on both the old format and the new format for which they are written. For example, if a conversion tool is designed to convert Cobol code into Java™ code, and later there is a need for converting DB2 (DB2 is a trade-mark of IBM Corporation in the United States, other countries, or both) database definitions into Java code, an entirely new conversion tool must be used. This is likewise true if a need arises for converting Cobol code into Extensible Markup Language (XML). In addition, the current tools are often stored and accessed separately so that users of the current tools may have difficulty finding the correct tool for a particular task.

In view of the foregoing, there exists a need for a solution that overcomes the shortcomings of the prior art.

SUMMARY OF THE INVENTION

In general, the present invention provides a component-based solution for converting a data source from a first format into a second format and a framework for such a tool. Specifically, the present invention includes reusable importer and resource writer components. Each importer component is designed to import all or a portion of a data source of a particular first data type and convert this data source from the first data type into an intermediate data type. A resource writer component may then convert the data source in the intermediate data type into an application artifact in the specific second data format that corresponds to the resource writer. The independence of the importer and resource writer components from each other allows a particular importer to be used in conjunction with a number of different resource writers to convert from a particular first format into a plurality of second formats. Similarly, multiple importers may be used with a single resource writer to convert a number of data sources in a number of different formats into an application artifact in a single format. Furthermore, a framework may be included within which the appropriate importer and resource writer may be stored and/or chosen from a plurality of importers and resource writers for performing a required conversion.

A first aspect of the present invention provides a method for configuring a data source in a first format for use in an environment requiring a second format, comprising: providing an importer corresponding specifically to the first format; providing a resource writer corresponding specifically to the second format, wherein the resource writer is independent from the importer; importing at least a portion of the data source using the importer; converting the at least a portion of the data source to intermediate data in an intermediate format using the importer; and producing, using the resource writer, at least one application artifact for use in the environment from the intermediate data.

A second aspect of the present invention provides a system for configuring a data source in a first format for use in an environment requiring a second format, comprising: an importer that corresponds specifically to the first format for importing at least a portion of the data source and converting the at least a portion of the data source to intermediate data in an intermediate format; and a resource writer, independent from the importer, that corresponds specifically to the second format, for producing at least one application artifact for use in the environment from the intermediate data.

A third aspect of the present invention provides a program product stored on a computer readable medium for configuring a data source in a first format for use in an environment requiring a second format, the computer readable medium comprising program code for causing a computer system to perform the following: provide an importer corresponding specifically to the first format; provide a resource writer corresponding specifically to the second format, wherein the resource writer is independent from the importer; import at least a portion of the data source using the importer; convert the at least a portion of the data source to intermediate data in an intermediate format using the importer; and produce, using the resource writer, at least one application artifact for use in the environment from the intermediate data.

A fourth aspect of the present invention provides a method for deploying an application for configuring a data source in a first format for use in an environment requiring a second format, comprising: providing an importer corresponding specifically to the first format; providing a resource writer corresponding specifically to the second format, wherein the resource writer is independent from the importer; importing at least a portion of the data source using the importer; converting the at least a portion of the data source to intermediate data in an intermediate format using the importer; and producing, using the resource writer, at least one application artifact for use in the environment from the intermediate data.

A fifth aspect of the present invention provides computer software embodied in a propagated signal for configuring a data source in a first format for use in an environment requiring a second format, the computer software comprising instructions for causing a computer system to perform the following: provide an importer corresponding specifically to the first format; provide a resource writer corresponding specifically to the second format, wherein the resource writer is independent from the importer; import at least a portion of the data source using the importer; convert the at least a portion of the data source to intermediate data in an intermediate format using the importer; and produce, using the resource writer, at least one application artifact for use in the environment of the second format from the intermediate data.

A sixth aspect of the present invention provides a method for configuring a data source in a first format for use in an environment requiring a second format, the method comprising managing a computer infrastructure that performs the process described herein; and receiving payment based on the managing.

Therefore, the present invention provides a method, system, and program product for configuring a data source in a first format for use in an environment requiring a second format.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the present invention provides a component-based solution for converting a data source from a first format into a second format and a framework for such a tool. Specifically, the present invention includes reusable importer and resource writer components. Each importer component is designed to import all or a portion of a data source of a particular first data type and convert this data source from the first data type into an intermediate data type. A resource writer component may then convert the data source in the intermediate data type into an application artifact in the specific second data format that corresponds to the resource writer. The independence of the importer and resource writer components from each other allows a particular importer to be used in conjunction with a number of different resource writers to convert from a particular first format into a plurality of second formats. Similarly, multiple importers may be used with a single resource writer to convert a number of data sources in a number of different formats into an application artifact in a single format. Furthermore, a framework may be included within which the appropriate importer and resource writer may be stored and/or chosen from a plurality of importers and resource writers for performing a required conversion.

Figure 1:
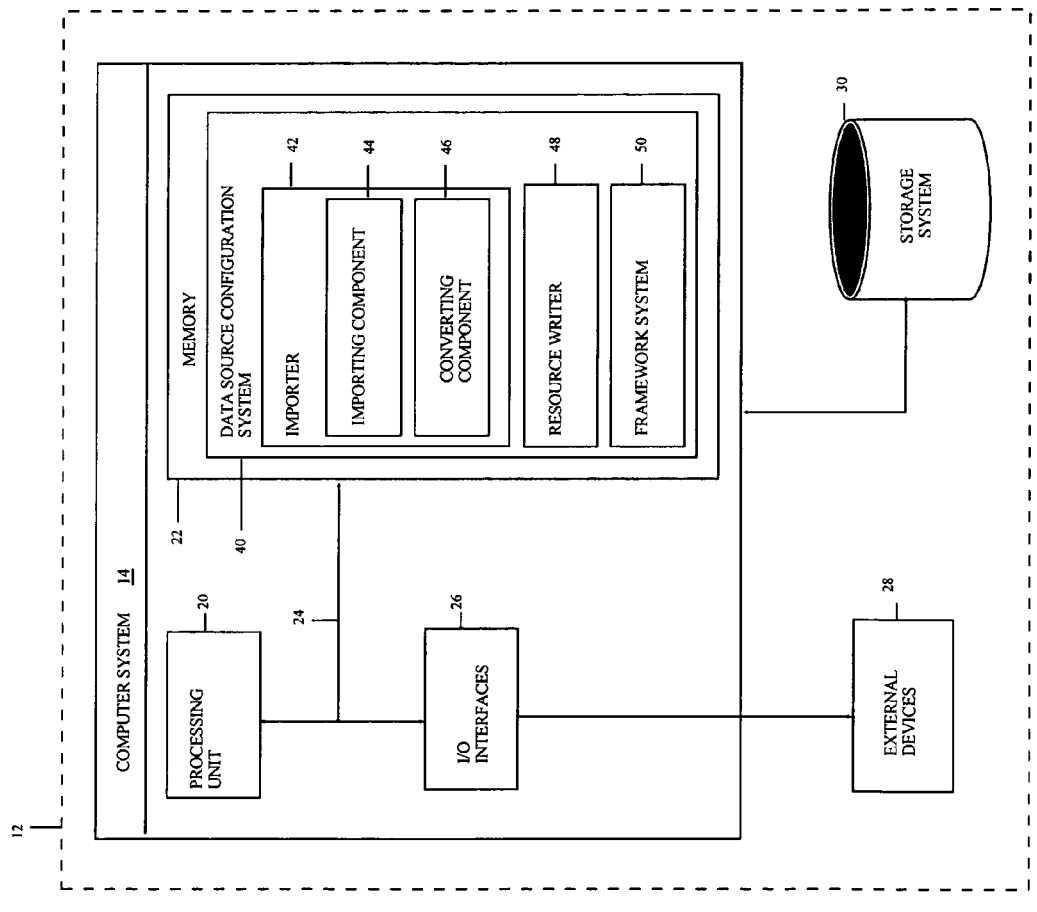
FIG. 1 shows an illustrative computer system for configuring a data source in a first format for use in an environment requiring a second format according to the present invention.

Referring now to FIG. 1, a system 10 for configuring a data source in a first format for use in an environment requiring a second format according to the present invention is shown. Specifically, FIG. 1 depicts a system 10 having individual and independent importers 42 for each format of a data source and individual and independent resource writers 48 for each format of an application artifact. System 10 also includes a framework within which the appropriate importer 42 and resource writer 48 may be stored and/or chosen from a plurality of importers 42 and resource writers 48 for performing a required conversion. In addition, system 10 allows importer 42 and resource writer 48 reusability by allowing one importer 42 to be used to convert from a data source of a particular type regardless of the format of the artifacts to be generated and by allowing one resource writer 48 to be used to convert to artifacts of a particular type regardless of the format of the imported data source.

As depicted, system 10 includes a computer system 14 deployed within a computer infrastructure 12. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by a conventional TCP/IP sockets-based protocol, and an Internet service provider could be used to establish connectivity to the Internet. Still yet, computer infrastructure 12 is intended to demonstrate that some or all of the components of system 10 could be deployed, managed, serviced, etc. by a service provider who offers to configure a data source in a first format for use in an environment requiring a second format.

As shown, computer system 14 includes a processing unit 20, a memory 22, a bus 24, and input/output (I/O) interfaces 26. Further, computer system 14 is shown in communication with external I/O devices/resources 28 and storage system 30. In general, processing unit 20 executes computer program code, such as a data source configuration system 40, which is stored in memory 22 and/or storage system 30. While executing computer program code, processing unit 20 can read and/or write data to/from memory 22, storage system 30, and/or I/O interfaces 26. Bus 24 provides a communication link between each of the components in computer system 14. External devices 28 can comprise any devices (e.g., keyboard, pointing device, display, etc.) that enable a user to interact with computer system 14 and/or any devices (e.g., network card, modem, etc.) that enable computer system 14 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, computer system 14 is only representative of various possible computer systems that can include numerous combinations of hardware and/or software. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 20 may comprise a single processing unit, or be distributed across one or more processing units in one or more locations, e.g., on a client and server. Similarly, memory 22 and/or storage system 30 can comprise any combination of various types of data storage and/or transmission media that reside at one or more physical locations. Further, I/O interfaces 26 can comprise any system for exchanging information with one or more external devices 28. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 28 (e.g., a display) and/or storage system(s) 30 could be contained within computer system 14, not externally as shown.

Storage system 30 can be any type of system (e.g., a database) capable of providing storage for information under the present invention. For example, storage system 30 may be used to store one or more data sources, intermediate data and/or artifacts created using the present invention. Furthermore, storage system 30 may also be used to store one or more of the importers 42 and/or resource writers 48 used to perform the operations of the present invention. Still further, storage system 30 may be used to store a framework within which the one or more importers 42 and/or resource writers 48 may be stored and/or assigned for performing a particular task. To this extent, storage system 30 could include one or more storage devices, such as a magnetic disk drive or an optical disk drive. In another embodiment, storage system 30 includes data distributed across, for example, a local area network (LAN), wide area network (WAN) or a storage area network (SAN) (not shown). Although not shown, additional components, such as cache memory, communication systems, system software, etc., may be incorporated into computer system 14.

Shown in memory 22 of computer system 14 is data source configuration system 40, which is a software program that provides the functions of the present invention. Data source configuration system 40 provides a system for configuring a data source in a first format for use in an environment requiring a second format. To this extent, data source configuration system 40 includes an importer 42, which itself has an importing component 44 and a converting component 46; a resource writer 48; and, optionally, a framework system 50.

Figure 2:
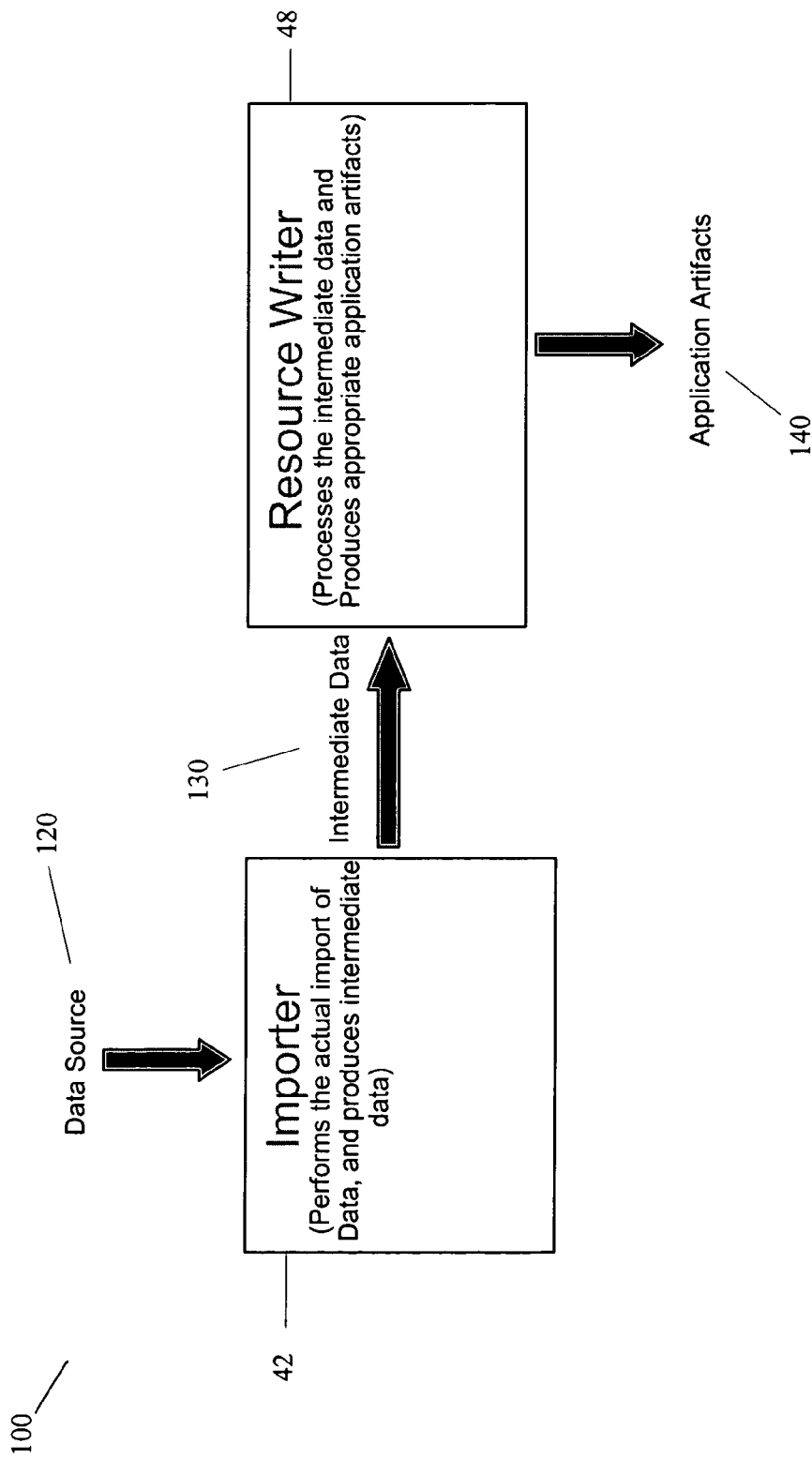
FIG. 2 shows one embodiment of an illustrative system of the present invention.
Figure 3:
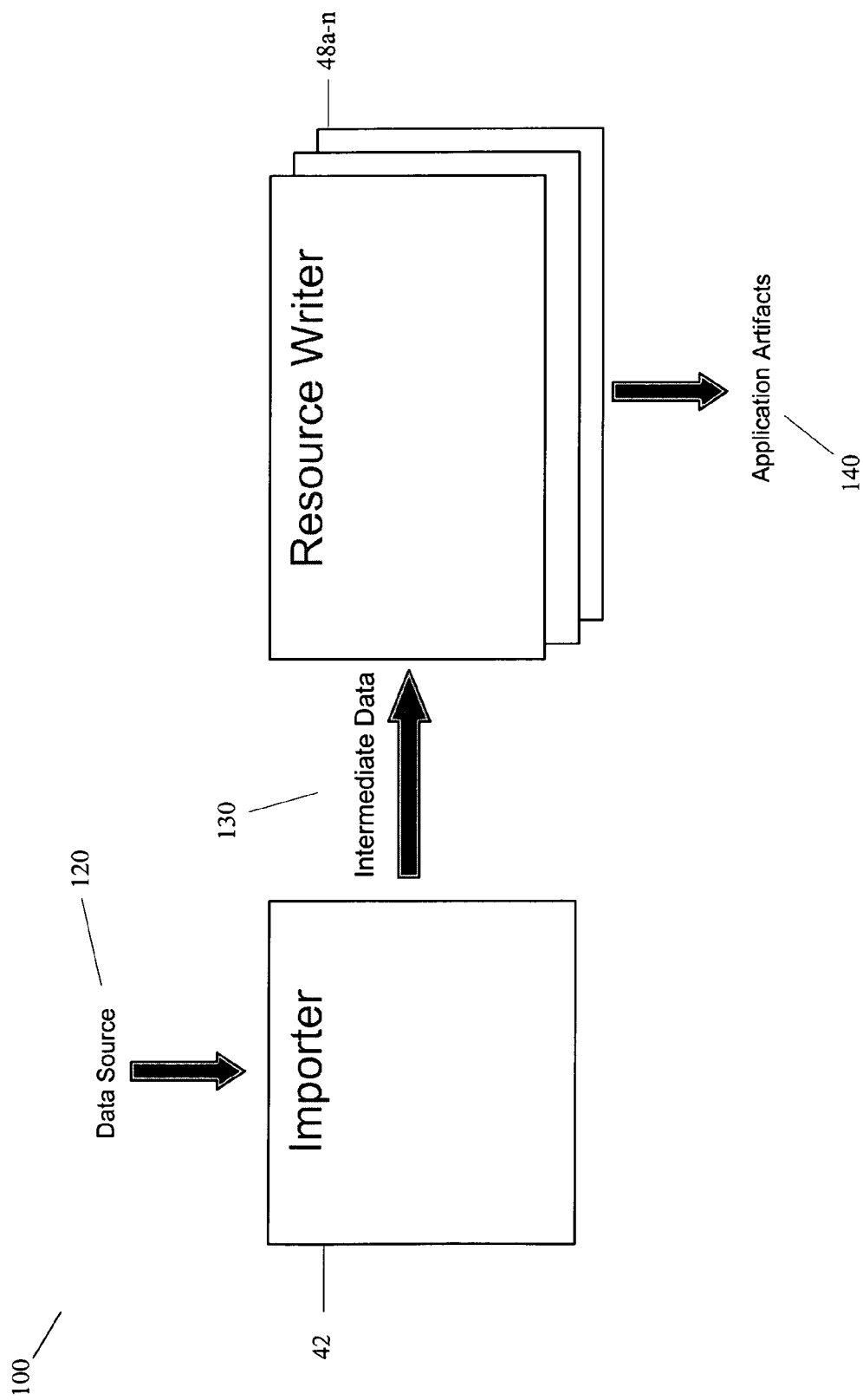
FIG. 3 shows an alternate embodiment of an illustrative system of the present invention.
Figure 4:
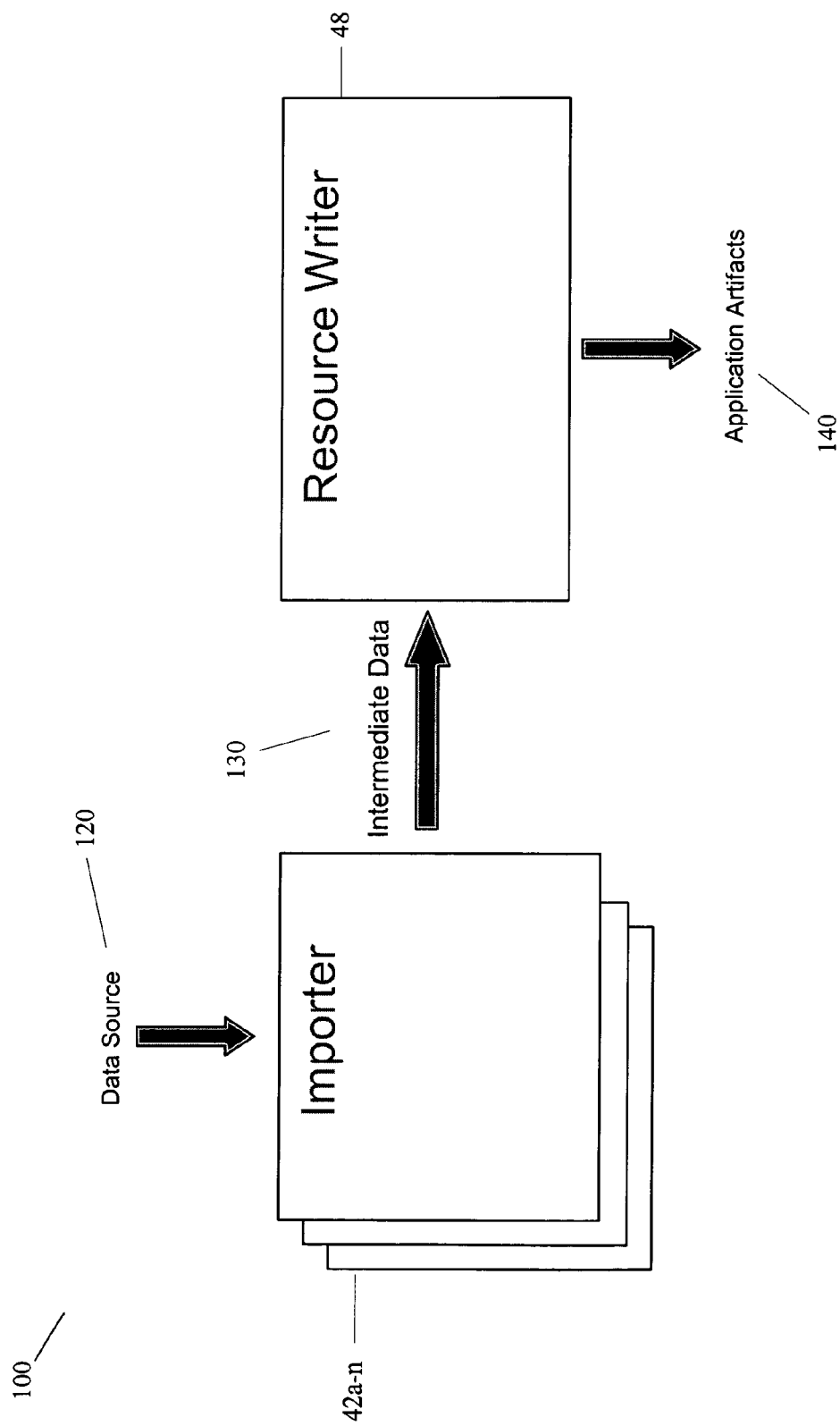
FIG. 4 shows an alternate embodiment of an illustrative system of the present invention.

FIGS. 2-4 show exemplary conversions of data source 120 by data source configuration system 40. Referring now to FIGS. 1 through 4, collectively, importer 42 imports data source 120 of a particular format and converts data source 120 to intermediate data 130 in an intermediate format. To this extent, importer 42 corresponds specifically to the format of the data source 120. For example, one importer 42 would be used to operate upon data source 120 having a format of Cobol whereas a separate importer 42 would be used to operate upon data source 120 having a format of a DB2 database. As such, data source 120 of any format could be operated on by data source configuration system 40 so long as an importer 42 that corresponds to the format of data source 120 is available.

In any case, in performing its functions, importer 42 makes use of importing component 44 and converting component 46. Importing component 44 imports data source 120, such as from storage system 30. To this extent, the entirety of data source 120 or a portion thereof may be copied or transferred for use by importer 42. Data source 120 may be in any format, but preferably comprises both data types and instructions. For example, data source 120 may comprise a Cobol structured data type with associated instructions. Similarly, data source 120 may comprise a function written in a structured language, such as C with its associated data definitions. Still further, data source 120 may comprise a data field in a structured database and/or spreadsheet program with its associated validating instructions. The above examples are not meant to be limiting, but rather, illustrate the wide variety of formats that data source 120 may assume.

Converting component 46 takes data source 120 that has been imported by importing component 44 and converts it into intermediate data 130. Intermediate data 130 created by converting component 46 is an expression of the functional equivalent of data source 120 in a common format. Thus, intermediate data 130 created from data sources 120 having different formats by importers 42*a-n* (FIG. 4) would have a common intermediate format. This format of intermediate data 130 could be a currently available development tool, such as a programming language that is particularly robust and able to incorporate the functional intricacies allowed by a variety of development tools. In the alternative, the format of intermediate data 130 could be a proprietary data format, such as proprietary metadata, that is able to incorporate all of the above features. Still further, a variety of different formats could by used for intermediate data 130 so long as resource writer 48 is adapted to read the particular format that is written by importer 48. In any case, intermediate data 130 may be transferred directly to resource writer 48 or, in the alternative, temporarily saved in storage system 30 for later use by resource writer 48.

Resource writer 48 takes intermediate data 130 that has been produced by one or a plurality of importers 42 and converts it into application artifact 140 in a particular format. To this extent, a particular resource writer 48 corresponds specifically to a particular format and would always be used to produce application artifact 140 in this format. For example, one resource writer 48 would be used to convert intermediate data 130 to application artifact 140 in a Java format whereas a separate resource writer 48 would be used to convert intermediate data 130 to application artifacts 140 having an XML format. As such, application artifacts 140 of any format could be produced from intermediate data 130 by data source configuration system 40 so long as a resource writer 48 that corresponds to the desired format of application artifacts 140 is available. In any event, the entirety of intermediate data 130 or a portion thereof may be copied or transferred for use by resource writer 48. Resource writer 48 may consume intermediate data 130 in the production of application artifacts 140, or may, in the alternative, allow a copy of intermediate data 130 to remain, such as in storage system 30, for use by another resource writer 48. Upon creation, application artifacts 140 may be saved in storage system 30 or used in any other way that is now known or later developed in the art.

Returning to FIGS. 2-4, a number of ways in which the data source configuration system 40 can be used to convert data source 120 are illustrated. In FIG. 2, one or a plurality of data sources 120 in a single format is imported and converted into intermediate data 130 by a single importer 42, and the intermediate data 130 is converted into one or more application artifacts 140 in a single format by a single resource writer 48. Likewise, in FIG. 3, one or a plurality of data sources 120 in a single format is imported and converted into intermediate data 130 by a single importer 42. However, the intermediate data 130 is converted into application artifacts 140 in a plurality of formats by a plurality of resource writers 48a-n. In contrast, in FIG. 4, a plurality of data sources 120 in a plurality of formats are imported and converted into intermediate data 130 by a plurality of importers 42a-n, and the intermediate data 130 is converted into one or more application artifacts 140 in a single format by a single resource writer 48.

Figure 5:
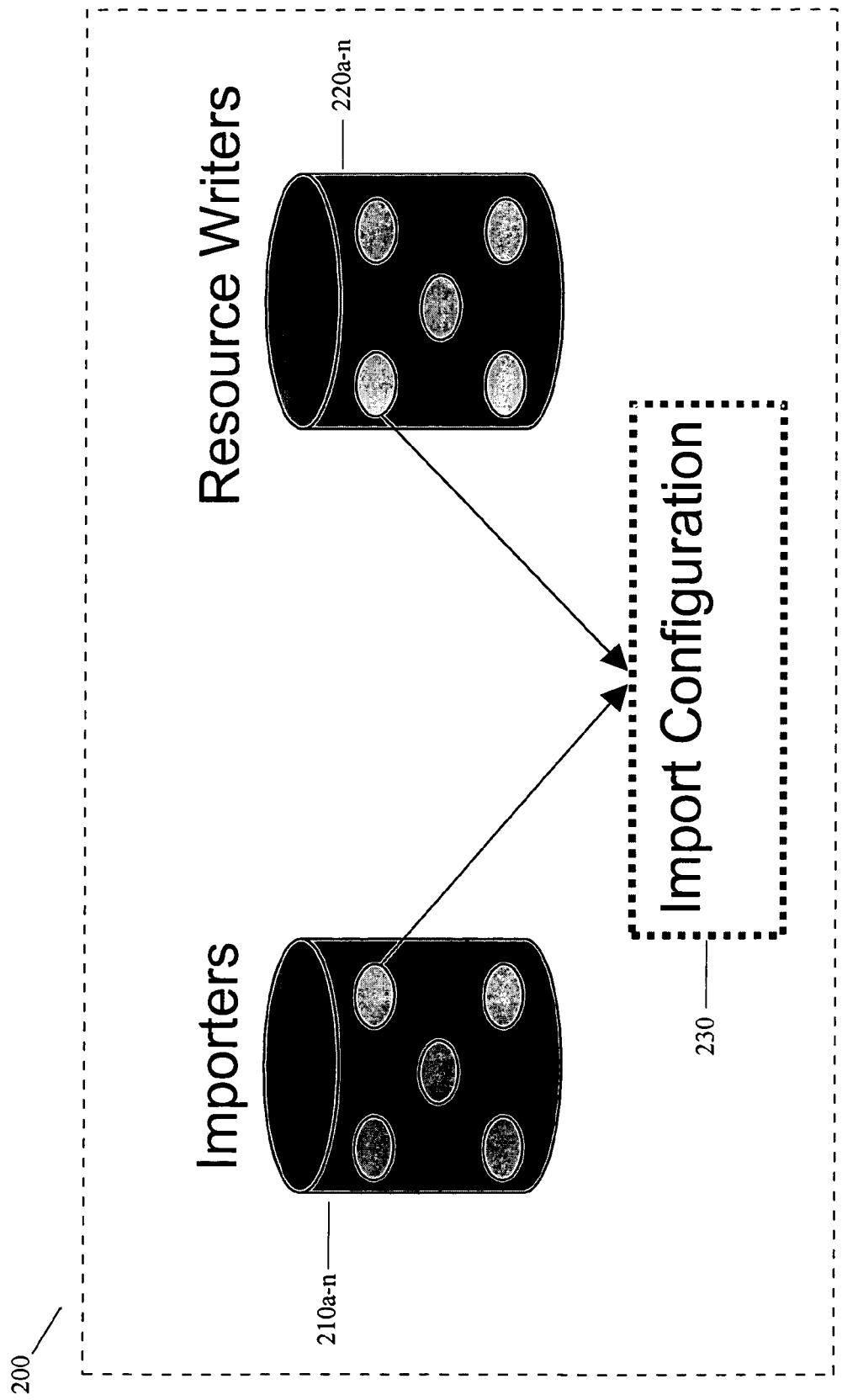
FIG. 5 shows a framework for a data source configuration system according to the present invention.

Referring now to FIGS. 1 and 5, concurrently, framework system 50 according to the present invention is shown. As stated herein framework system 50 may be used to provide one or more importers 42 and/or one or more resource writers 48 accomplishing a particular task. To this extent, framework system 50 may provide a framework for storing a particular importer 42 with a plurality of importers 42a-n and/or for storing a particular resource writer 48a-n with a plurality of resource writers 48a-n. In addition or in the alternative, framework system 50 may provide tools for accessing one or more importers 42a-n and/or resource writers 48a-n. In one embodiment, framework system 50 may provide an interface, such as a graphical user interface, to allow a user to choose a particular importer and/or resource writer for use in creating application artifacts 140 of a particular format from data source 120 of a particular format. Furthermore, the particular choices of the user may be stored, such as in storage system 30, as an import configuration 230. This import configuration 230 may comprise any or a combination of a default importer 210a-n for use with a particular format of data source 120; a default resource writer 220a-n for use in writing application artifacts 140 of a particular format; and/or a combiner that, given a data source 120 and a desired type of application artifact 140, chooses the correct importer 42 and resource writer 48 for performing the operation.

Figure 6:
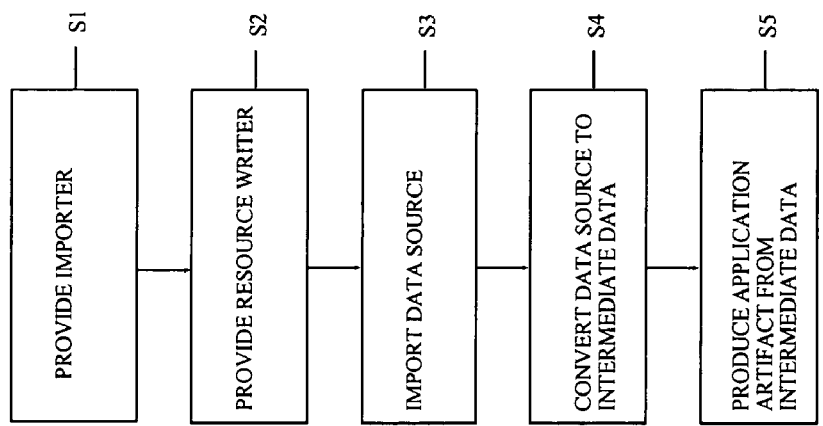
FIG. 6 shows an illustrative method flow diagram according to the present invention.

Turning now to FIG. 6, a flow chart of a method according to an embodiment of the present invention is depicted, which is described with reference to FIG. 1. In step S1, an importer 42 is provided. Importer 42 corresponds to a single data format of data source 120 and may be provided by framework system 50 or by any manner now known or later developed for providing a conversion tool. In step S2, a resource writer 48 is provided. As with importer 42, resource writer 48 may be provided by framework system 50 or by any manner now known or later developed for providing a conversion tool and corresponds to a particular format of application artifacts 140 to be produced. In step S3, importing component 44 of importer 42 imports at least a portion of data source 120. In step S4, converting component 46 of importer 42 converts the imported portion of data source 120 to intermediate data 130 in an intermediate format. As stated above, the format of intermediate data 130 is a common format that is output by all importers 42 and input to all resource writers 48. Finally, in step S5, resource writer 48 produces at least one application artifact 140 for use in the environment of the second format from the intermediate data 130 created by importer 42.

While shown and described herein as a method and system for configuring a data source in a first format for use in an environment requiring a second format, it is understood that the invention further provides various alternative embodiments. For example, in one embodiment, the invention provides a computer-readable/useable medium that includes computer program code to enable a computer infrastructure to accumulate and analyze transactional data to detect a behavior change. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 30 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a method that performs the process steps of the invention on a subscription, advertising, and/or fee basis. That is, a service provider, such as a Solution Integrator, could offer a service that configures a data source in a first format for use in an environment requiring a second format. In this case, the service provider can create, maintain, support, etc., a computer infrastructure, such as computer infrastructure 12 (FIG. 1) that performs the process steps of the invention for one or more entities. In return, the service provider can receive payment from the entity(s) under a subscription and/or fee agreement and/or the service provider can receive payment from the sale of advertising content to one or more third parties.

In still another embodiment, the invention provides a computer-implemented method for configuring a data source in a first format for use in an environment requiring a second format. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code " are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for configuring a data source in a first format for use in an environment requiring a second format, comprising:

providing an importer corresponding specifically to the first format, wherein the first format is an application format;

providing a resource writer corresponding specifically to the second format, wherein the resource writer is independent from the importer and wherein the second format is an application format;

importing at least a portion of the data source using the importer;

converting, via a computer device, the at least a portion of the data source to intermediate data in an intermediate format using the importer;

producing, using the resource writer, at least one application artifact for use in the environment from the intermediate data;

providing a second resource writer corresponding specifically to a third format, wherein the second resource writer is independent from the importer and the resource writer and wherein the third format is an application format;

importing at least a portion of a second data source using the importer;

converting, via the computer device, the at least a portion of the second data source to intermediate data in an intermediate format using the importer; and producing, using a second resource writer, at least one application artifact for use in a second environment requiring the third format from the intermediate data.

2. The method of claim 1, wherein the at least one application artifact comprises program code.

3. The method of claim 1, wherein the at least one application artifact comprises at least one data structure and at least one rule for validating data of the at least one data structure.

4. The method of claim 1, wherein the second format is selected from the group consisting of Java and XML.

5. The method of claim 1, wherein the importer is one of a plurality of importers, each importer in the plurality of importers corresponding to a distinct first format.

6. The method of claim 1, wherein the resource writer is one of a plurality of resource writers, each resource writer in the plurality of resource writers corresponding to a distinct second format.

7. The method of claim 1, wherein the importer and the resource writer are provided by a framework that determines an appropriate one of the importer from a plurality of importers and determines an appropriate one of the resource writer from a plurality of resource writers.

8. A system for configuring a data source in a first format for use in an environment requiring a second format, comprising:

a computer device;

an importer that corresponds specifically to the first format for importing at least a portion of the data source and converting the at least a portion of the data source to intermediate data in an intermediate format, wherein the first format is an application format;

a resource writer, independent from the importer, that corresponds specifically to the second format, for producing at least one application artifact for use in the environment from the intermediate data, wherein the second format is an application format; and a second resource writer, corresponding specifically to a third format, for producing at least one application artifact for use in a second environment from the intermediate data, wherein the second resource writer is independent from the importer and the resource writer and wherein the third format is an application format.

9. The system of claim 8, wherein the at least one application artifact comprises program code.

10. The system of claim 8, wherein the at least one application artifact comprises at least one data structure and at least one rule for validating data of the at least one data structure.

11. The system of claim 8, wherein the second format is selected from the group consisting of Java and XML.

12. The system of claim 8, wherein the importer is one of a plurality of importers, each importer in the plurality of importers corresponding to a distinct first format.

13. The system of claim 8, wherein the resource writer is one of a plurality of resource writers, each resource writer in the plurality of resource writers corresponding to a distinct second format.

14. The system of claim 8, further comprising a framework for providing the importer and the resource writer by determining an appropriate one of the importer from a plurality of importers and determining an appropriate one of the resource writer from a plurality of resource writers.

15. A program product stored on a computer readable storage medium for configuring a data source in a first format for use in an environment requiring a second format, the computer readable medium comprising:

program code corresponding specifically to the first format for importing at least a portion of the data source and for converting the at least a portion of the data source to intermediate data in an intermediate format, wherein the first format is an application format;

program code, independent from the program code for importing, corresponding specifically to the second format, for producing at least one application artifact for use in the environment from the intermediate data, wherein the second format is an application format; and program code, corresponding specifically to a third format, for producing at least one application artifact for use in a second environment from the intermediate data, wherein the second resource writer is independent from the importer and the resource writer and wherein the third format is an application format.

16. The program product of claim 15, wherein the program code for importing is one of a plurality of importers, each importer in the plurality of importers corresponding to a distinct first format.

17. The program product of claim 15, wherein the program code for producing is one of a plurality of resource writers, each resource writer in the plurality of resource writers corresponding to a distinct second format.

18. The program product of claim 15, wherein the program code for importing and the program code for producing are provided by a framework that determines an appropriate importer from a plurality of importers and determines an appropriate resource writer from a plurality of resource writers.

19. A method for deploying an application for configuring a data source in a first format for use in an environment requiring a second format, comprising:

providing a computer infrastructure having at least one computer device being operable to:

provide an importer corresponding specifically to the first format, wherein the first format is an application format;

provide a resource writer corresponding specifically to the second format, wherein the resource writer is independent from the importer and wherein the second format is an application format;

import at least a portion of the data source using the importer;

convert the at least a portion of the data source to intermediate data in an intermediate format using the importer;

produce, using the resource writer, at least one application artifact for use in the environment from the intermediate data;

provide a second resource writer corresponding specifically to a third format, wherein the second resource writer is independent from the importer and the resource writer and wherein the third format is an application format;

import at least a portion of a second data source using the importer;

convert, via the computer device, the at least a portion of the second data source to intermediate data in an intermediate format using the importer; and produce, using a second resource writer, at least one application artifact for use in a second environment requiring the third format from the intermediate data.

20. The method of claim 19, wherein the importer and the resource writer are provided by a framework that determines an appropriate one of the importer from a plurality of importers and determines an appropriate one of the resource writer from a plurality of resource writers.

* * * * *